United States Patent
Inukai et al.

(10) Patent No.: US 7,691,958 B2
(45) Date of Patent: Apr. 6, 2010

(54) POLYPROPYLENE AND APPLICATION OF SAID POLYPROPYLENE TO ELECTRIC MATERIAL

(75) Inventors: Akihiro Inukai, Aichi (JP); Jyun Birukawa, Ichihara (JP); Shuji Matsumura, Takaishi (JP)

(73) Assignee: Prime Polymer Co., Ltd., Tokyo (JP)

( * ) Notice: Subject to any disclaimer, the term of this patent is extended or adjusted under 35 U.S.C. 154(b) by 0 days.

(21) Appl. No.: 11/791,532

(22) PCT Filed: Nov. 25, 2004

(86) PCT No.: PCT/JP2004/017902

§ 371 (c)(1),
(2), (4) Date: May 24, 2007

(87) PCT Pub. No.: WO2006/057066

PCT Pub. Date: Jun. 1, 2006

(65) Prior Publication Data

US 2008/0042323 A1     Feb. 21, 2008

(51) Int. Cl.
*C08F 110/06* (2006.01)
*C08J 5/18* (2006.01)
*C08L 23/12* (2006.01)

(52) U.S. Cl. ............ 526/351; 526/348; 526/348.1
(58) Field of Classification Search ............ 526/348, 526/348.1, 351
See application file for complete search history.

(56) References Cited

U.S. PATENT DOCUMENTS

| | | | |
|---|---|---|---|
| 4,692,837 A | 9/1987 | Crass et al. | |
| 4,851,499 A * | 7/1989 | Rifi | 528/494 |
| 5,085,916 A | 2/1992 | Wilhelm et al. | |
| 5,476,709 A | 12/1995 | Inoue et al. | |
| 5,573,840 A * | 11/1996 | Inoue et al. | 428/216 |
| 5,729,423 A | 3/1998 | Donde et al. | |
| 5,745,331 A | 4/1998 | Shamouilian et al. | |
| 5,801,915 A | 9/1998 | Kholodenko et al. | |
| 6,094,337 A | 7/2000 | Ueda et al. | |
| 6,723,795 B1 | 4/2004 | Dupire et al. | |
| 7,220,812 B2 * | 5/2007 | Jaaskelainen et al. | 526/348 |

FOREIGN PATENT DOCUMENTS

| | | |
|---|---|---|
| CN | 1198759 A | 11/1998 |
| EP | 0 575 111 A2 | 12/1993 |
| JP | 62-113548 A | 5/1987 |
| JP | 2-150443 A | 6/1990 |
| JP | 6-236709 A | 8/1994 |
| JP | 8-507196 A | 7/1996 |
| JP | 9-52917 A | 2/1997 |
| JP | 9-270364 A | 10/1997 |
| JP | 2003-502468 A | 1/2003 |
| JP | 2004-2655 A | 1/2004 |
| KR | 10-0252418 B1 | 4/2000 |

* cited by examiner

*Primary Examiner*—Roberto Rábago
(74) *Attorney, Agent, or Firm*—Birch, Stewart, Kolasch & Birch, LLP

(57) ABSTRACT

A polypropylene for an electric material has a melt flow rate of 0.1 to 30 g/10 min., a mesopentad fraction calculated from a $^{13}$C-NMR spectrum of 0.90 to 0.99, and a firing residue of 50 ppm by weight or less based on the polypropylene, a titanium content and an iron content which are detected from the firing residue, of 1 ppm by weight or less and 0.1 ppm or less, respectively, based on the polypropylene, and the chlorine content of 5 ppm by weight or less based on the polypropylene. The above polypropylene exhibits excellent electric insulation and has a roughened surface when it is formed into a film, and thus the polypropylene can be suitably used for a capacitor film without using an additive such as a β crystal nucleating agent. The polypropylene is also useful as a material of a film for coating an electric wire and a material for an instrument for conveying an electronic material.

6 Claims, No Drawings

US 7,691,958 B2

POLYPROPYLENE AND APPLICATION OF SAID POLYPROPYLENE TO ELECTRIC MATERIAL

TECHNICAL FIELD

The present invention relates to a polypropylene suitably used in electric materials and, particularly, applications for which a high degree of electrical insulation properties is required, to a polypropylene sheet obtained from the polypropylene, to a stretched film obtained by stretch-molding the sheet, to a non-stretched film and to an electronic material conveying instrument obtained by injection-molding the polypropylene.

BACKGROUND ART

Polypropylene has been utilized in diverse states for a wide range of raw materials for electric appliances owing to its excellent electrical insulation characteristics. For example, high-purity polypropylene which is extremely reduced in impurities caused by a catalyst is made into a film as thin as 20 μm or less and, in recent years, 5 μm or less, and is applied to a high-performance condenser (for example, Japanese Patent Application Laid-Open (JP-A) No. 6-236709).

However, it is difficult to say that the electrical insulation characteristics of polypropylene currently used are universal in all applications, and if a polypropylene having higher insulation characteristics can be stably provided, it is industrially very useful. As a method for solving this problem, earnest studies have been made to provide a highly purified polypropylene, for example, by using a method where remaining catalyst residue and chlorine content is reduced as much as possible, as disclosed in publications of JP-A Nos. 62-113548 and 2-150443. The present inventors also recognize that the insulation characteristics of polypropylene are significantly improved by these methods. At the same time, the present inventors also recognize that such polypropylene obtained in these methods does not necessarily provide a fixed level of electric insulation characteristics well reproducibly. Namely, the electric insulation characteristics sometimes vary largely between lots and the electric insulation characteristics sometimes vary depending on the position of sampling even if polypropylene materials obtained in the same lot are molded to produce electric materials. It is reasonable that in the case of continuously producing molded products for electric material from polypropylene in an industrial scale, a limitation is placed upon the frequency of pre-quality control of raw material polypropylene from the viewpoint of production speed and production cost. Therefore, if a maximum amount of polypropylene for electric materials can be obtained stably by making pre-quality checks in the smallest frequency, it can be said that this gives very enormous contribution to the development of polypropylene industries.

DISCLOSURE OF THE INVENTION

The present inventors have made studies as to the reason why the electric characteristics of the molded articles obtained from a polypropylene sometimes vary largely between product lots or between sampling positions even if polypropylene materials obtained in the same lot are molded (the sampling positions mean positions of a film cut partly for measuring in the case of, for example, an electric material being a stretched film). The inventors have also made earnest studies as to measures for eliminating such a variation by investigating back to a polypropylene as a raw material. As a result, they have found that if a polypropylene for an electric material which satisfies the following requirements [1] to [3] at the same time is used, the above problem is solved and a polypropylene for an electric material having high electric insulation characteristics which are suppressed in the variation range between production lots or within a production lot to substantially zero can be obtained. Based on this finding, the present invention has been completed.

[1] Melt flow rate is 0.1 to 30 g/10 min.

[2] Mesopentad fraction calculated from a $^{13}$C-NMR spectrum is 0.90 to 0.99.

[3] Firing residue is 50 ppm by weight or less based on the polypropylene, the titanium content and iron content which are detected from the firing residue are 1 ppm by weight or less and 0.1 ppm or less, respectively, based on the polypropylene, and the chlorine content is 5 ppm by weight or less based on the propylene.

A preferable embodiment of the polypropylene (R) of the present invention is a polypropylene satisfying the following requirement [4] in addition to the requirements [1], [2] and [3]. A more preferable embodiment of the polypropylene (R) is a polypropylene satisfying the following requirement [5] in addition to the above requirements [1] to [4].

[4] The integrated amount of eluate measured up to 110° C. is 30% by weight or less and the integrated amount of eluate measured up to 100° C. is 7.0% by weight or less, in a cross fraction chromatography [hereinafter abbreviated as "CFC method" as the case may be].

[5] Mz/Mn and Mw/Mn determined from GPC are 15 or more and 5 or more, respectively.

The present invention relates to a polypropylene sheet (S) which has a β crystal fraction of 0.15 or more and is obtained by heat-melting, extruding and gradually cooling the above polypropylene (R).

The present invention also relates to a stretched film (F) obtained by stretching the above polypropylene sheet (S). A preferable embodiment of the stretched film (F) is a capacitor film (F').

Further, the present invention relates to a non-stretched film (F") obtained by heat-melting and extruding the above polypropylene (R).

Still further, the present invention relates to an electronic material conveying instrument (A) obtained by injection-molding the above polypropylene (R).

BEST MODES FOR CARRYING OUT THE INVENTION

The polypropylene (R) of the present invention is a polypropylene for an electric material satisfying the following requirements [1] to [3] at the same time.

[1] Melt flow rate is 0.1 to 30 g/10 min.

[2] Mesopentad fraction calculated from a $^{13}$C-NMR spectrum is 0.90 to 0.99.

[3] Firing residue is 50 ppm by weight or less based on the polypropylene, the titanium content and iron content detected from the firing residue are 1 ppm by weight or less and 0.1 ppm or less, respectively, based on the polypropylene, and the chlorine content detected from the firing residue is 5 ppm by weight or less based on the polypropylene.

The polypropylene (R) of the present invention is a crystalline polypropylene and a homopolymer of propylene or a copolymer of propylene and ethylene or an α-olefin having 4 to 20 carbon atoms (in the following explanations, propylene, ethylene and α-olefins having 4 to 20 carbon atoms are generically called "monomer" as the case may be). Examples of the above α-olefins having 4 to 20 carbon atoms include 1-butene, 1-pentene, 1-hexene, 4-methyl-1-pentene, 1-octene, 1-decene, 1-dodecene, 1-tetradecene, 1-hexadecene, 1-octadecene and 1-eicosene. Of these, ethylene or α-olefins having 4 to 10 carbon atoms are preferable. These α-olefins may form a random copolymer or block copolymer in combination with propylene. The total content of structural units derived from ethylene or α-olefins is 5 mol % or less and preferably 2 mol % or less in the polypropylene.

The MFR (ASTM D-1238, 230° C., load: 2.16 kg) of the polypropylene (R) of the present invention is 0.1 to 30 g/10 min. When the MFR of the polypropylene (R) is in the range of from particularly, 0.5 to 10 g/10 min., more preferably 1 to 8 g/10 min. and particularly preferably 1.5 to 5.0 g/10 min., the polypropylene is preferably used in the application of a biaxially orientated film. Also, when the MFR is in the range of from 10 to 30 g/10 min., the polypropylene is preferably used for injection-molding of high-strength molded products such as electronic material conveying instruments.

The value of the mesopentad fraction $[M_5]$ determined by the equation (Eq-1) from the absorption intensities of $P_{mmmm}$ and $P_w$ of the $^{13}$C-NMR spectrum is in the range of from 0.90 to 0.99, preferably 0.920 to 0.990, and more preferably 0.932 to 0.990.

$$[M_5]=[P_{mmmm}]/[P_w] \quad \text{(Eq-1)}$$

(In the above formula, $[P_{mmmm}]$ is an absorption intensity derived from a methyl group of the third unit in the site where five propylene units are continuously isotactic-bonded, and $[P_w]$ is an absorption intensity derived from all the methyl groups of the propylene units.)

A sheet and a stretched film obtained from a highly rigid polypropylene having such a mesopentad faction $[M_5]$ of 0.90 to 0.99, and particularly 0.950 or more, have excellent insulation properties, and moreover excellent mechanical properties and dimensional stability.

When $[M_5]$ is less than 0.9, films are frequently insufficient in mechanical properties and electric insulation properties, whereas when $[M_5]$ exceeds 0.99, stretch-molding of the film is sometimes difficult.

The firing residue of the polypropylene of the present invention is 50 ppm by weight or less and preferably 30 ppm by weight or less based on the polypropylene. Also, the titanium content detected from the firing residue (sometimes called "ash" in the following explanations) is 1 ppm by weight or less and preferably 0.5 ppm by weight or less based on the polypropylene. Moreover, the iron content detected from the firing residue is 0.1 ppm by weight or less and preferably 0.05 ppm by weight or less based on the polypropylene. Also, the chlorine content detected from the firing residue is 5 ppm by weight or less and preferably 3 ppm by weight or less based on the polypropylene. As to the firing residue, the titanium content and the chlorine content among impurities in the above polypropylene, the insulating characteristics of electric materials obtained from the polypropylene are more improved as these impurities are decreased, as described in JP-A No. 6-236709 which has been already disclosed by the present applicants. It should be noted in the present invention that it has been clarified for the first time by the present invention that the iron content among the above impurities is a material that is the cause of a variation in the insulation characteristics of electric materials between production lots or in the same production lot. Until this time, there has been the case where partial defects in the same lot are noticeable when it is intended to prepare a film having a wide area in the case of a film as thin as 10 μm or less. However, it has been clarified that even such a partial defect is completely overcome by the polypropylene of the present invention. (the term "production lot of the polypropylene" used in the present invention means an assembly of the same products that are produced continuously or in batch as a product unit under a fixed condition.)

As is clear from the examples and comparative examples of the present application which will be explained later, a large variation in electric insulation properties between lots or within a lot can be completely suppressed by maintaining the concentration of iron to 0.1 ppm by weight or less and preferably 0.05 ppm by weight or less, though the firing residue, titanium content and chlorine content are the same. It is, however, necessary to make further analysis including scientific morphological analysis of iron in order to clarify the reason why such a micro-variation leads to a variation in quality.

Such a polypropylene provides excellent electric insulation properties stably in a well reproducibility and is therefore suitably used for original roll sheets for a capacitor film or raw resins for a capacitor film.

In the applications of stretched films, particularly, a film having a roughened surface in which the polypropylene of the present invention is preferably used, a polypropylene having a Mw/Mn of 5 or more and preferably 6 or more and a Mz/Mn of 15 or more and preferably 20 or more is used. As to the moldability, the polypropylene showing such a wide molecular weight distribution produces many β crystals (the β crystal fraction when using the polypropylene of the present invention is 0.15 or more as will be described later) in the case where an extrusion molded product thereof is cooled slowly, and therefore, a surface-roughened film can be obtained by stretching at a specified temperature range. In such a surface-roughened film, many irregularities arise on the surface thereof and it is therefore possible to prevent the blocking of the film even if an inorganic material such as silica and a β crystal nucleating agent is not blended, showing remarkably superior operability and handling characteristics. The Mw/Mn and Mz/Mn may be made to be 5 or more and 15 or more, respectively, by using a metallocene catalyst providing a narrow molecular weight distribution wherein, for example, the concentration of hydrogen is controlled, by adopting multistage polymerization or by blending polypropylene having a wide molecular weight distribution, or in combination of these. That is, the polypropylene (R) of the present invention is not limited by its production method insofar as the requirements described in the claims of the patent application of this case are satisfied.

However, it is preferable to carry out polymerization by using a high-performance titanium type catalyst carrying magnesium chloride or a catalyst system obtained by combining a metallocene compound of a IV group transition metal such as zirconium or titanium and an organometallic compound or organoaluminum compound from the viewpoint of minimizing the amount of a firing residue and the contents of titanium and chlorine in the polypropylene.

The polypropylene produced under the aforementioned polymerization conditions is usually subjected to after-treatment such as decomposition or removal of the catalyst remained in the polypropylene. As after-treatment methods, a method described in JP-A No. 6-236709 which has been filed by the present applicant and already published can be used without any additional technologies. Specifically, for example, there can be adopted a method in which catalyst residues are dissolved using alcohol or glycol, and then the resultant product is washed with a hydrocarbon compound or water and is further heat-treated using an epoxy compound. In order to obtain the polypropylene (R) of the present invention, it is necessary to reduce the iron content in addition to the firing residue, titanium content and chlorine content. The iron content in the polypropylene can be reduced in proportion to the amount of the firing residue until it reaches 1 ppm by weight based on the polypropylene. However, to reduce the residual iron content to below 1 ppm by weight, the catalyst preparation and polymerization process should be carefully controlled to prevent any iron or iron-derived compounds from contaminating the polymerization system. By this strict process control, the residual iron content is reduced to not more than 0.1 ppm by weight. For example, such a process control includes a method in which earnest care is taken to prevent the contamination from a polymerization reactor material containing iron, a method in which the use of a crusher and milling instruments made from iron materials is reduced as much as possible and a method in which in a resin solution and a polymerization catalyst component solution containing iron components highly possibly, the use of the lowest portion of the solution is reduced as much as possible. Of course, crude polypropylene is heated at a temperature above its melting point in the co-presence of a solvent according to the need, then put into a molten state and subjected to filtration using a physical separation and purification method such as precision filtration using a sintered metal filter or a ceramic filter, to thereby reduce the iron content to 0.1 ppm by weight or less, however, it is needless to say that this method is unsuitable to the production of molded articles on a large scale.

The polypropylene of the present invention may be subjected to drying treatment carried out in such a manner that the volatile content (a reduction in weight when, for example, about 10 g of a sample is kept at 110° C.±2° C. and treated in a 1 NL/min. nitrogen stream for 60 minutes) is reduced to 100 ppm by weight or less and particularly 10 ppm by weight or less to make a polypropylene suitable for appliances for conveying electronic materials.

The polypropylene (R) of the present invention has an integrated amount of eluate measured up to 110° C. by the CFC method of 30% or less, preferably 27% or less and more preferably 25% or less. Also, the polypropylene has an integrated amount of eluate measured up to 100° C. by the CFC method being 7.0% or less, preferably 6.0% or less and more preferably 5.0% or less. When the integrated amount of the polypropylene is within this range, the anti-blocking characteristics, slipping characteristics, dimensional stability, rigidity under high temperatures and appearance of a film are improved, and particularly these characteristics when the film is stored for a long period of time are improved. Further, the electric properties and particularly the anti-breakdown voltage when the film is used as a capacitor film are improved. Also, the amount of the polypropylene eluted into oil of an oil impregnation type condenser part is reduced, and thus it is considered that the polypropylene largely contributes to the long-term stability of the electronic properties.

When the polypropylene (R) having the above characteristics is heat-melted at 170 to 280° C. and preferably 190 to 230° C., then extruded, and air-cooled or slowly cooled by a cooling roll kept at 60° C. or more, preferably 70° C. or more and more preferably 90 to 110° C., the obtained sheet has a β crystal fraction of 0.15 or more, preferably 0.17 or more and more preferably 0.18 to 0.50. Here, this β crystal fraction is a value of the polypropylene containing no β crystal nucleating agent. The slow cooling is preferably carried out at a tensile speed of 0.2 to 3 m/min. and the cooling time using a cooling roll of 0.3 to 4.5 minutes such that the thickness of the sheet obtained by passing it through the cooling roll becomes 0.1 to 3 mm. In the case of such a polypropylene having a β crystal fraction of 0.15 or more, irregularities arise on the surface of a film when the film is stretched and the polypropylene is superior in anti-blocking characteristics and is therefore satisfactorily usable as a capacitor film.

No particular limitation is imposed on the catalyst used to produce the polypropylene of the present invention which is suitably used in electric material film applications as mentioned above, and multistage polymerization is generally adopted in many cases in order to attain efficient production. Specifically, the polymerization of the propylene may be carried out in two stages or three-stages, or also, the polypropylene (R) may be produced by carrying out polymerization in a multistage, namely, four or more stages if there is no restriction on equipment such as the number of polymerization reactors, and any restriction is not imposed on the number of stages.

When using the polypropylene of the present invention as starting material to form electric materials such as films by molding, other resins, rubber and the like may be added to the polypropylene of the present invention according to the need to the extent that the object of the present invention is not impaired. Examples of the other resins and rubber include polyα-olefins such as polyethylene, polybutene-1, polyisobutene, polypentene-1 and polymethylpentene-1; ethylene or α-olefin/α-olefin copolymers such as an ethylene/propylene copolymer having a propylene content less than 75% by weight, ethylene/butene-1 copolymer, propylene.butene-1 copolymer having a propylene content less than 75% by weight; ethylene or α-olefin/α-olefin/diene monomer copolymers such as an ethylene/propylene/5-ethylidene-2-norbornane copolymer having a propylene content less than 75% by weight; vinyl monomer/diene monomer random copolymers such as a styrene/butadiene random copolymer; vinyl monomer/diene monomer/vinyl monomer block copolymers such as a styrene/butadiene/styrene block copolymer; hydrogenated (vinyl monomer/diene monomer random copolymers) such as a hydrogenated (styrene/butadiene random copolymer) and hydrogenated (vinyl monomer/diene monomer/vinyl monomer block copolymers) such as a hydrogenated (styrene/butadiene./styrene block copolymer).

The amount of these other polymers to be added vary depending on the type of resin and type of rubber to be added. The amount is in a range where the object of the present invention is not impaired, but it is usually preferably about 5 parts by weight or less based on 100 parts by weight of the polypropylene.

When the polypropylene of the present invention is used as starting material to form a sheet or film, additives such as antioxidants, ultraviolet absorbers, metal soaps, stabilizers such as hydrochloric acid absorber, lubricants, plasticizers, flame retardants, antistatic agents may be added to the extent that the object of the present invention is not impaired.

The polypropylene sheet of the present invention is a sheet which is obtained by molding the above polypropylene into a sheet form by using the above method and has a β crystal fraction of 0.15 or more. The sheet molding method may be a method using a T-die or a circular die. The thickness of each of these sheets is usually 0.1 to 3 mm and preferably 0.2 to 1.5 mm though there is no particular limitation to it. The polypropylene sheet of the present invention may be further stretched according to the need to obtain a stretched film. An original roll sheet for a capacitor film according to the present invention is stretched and used as a capacitor film. The stretching can be usually carried out by reheating a film to a temperature between 100° C. to the melting point by using a known method such as a stretching roll and/or a tenter type stretching, or a tubular type stretching. As the stretch ratio in the case of biaxial orientation, the longitudinal direction is about 3 to 7 times and the lateral direction is about 3 to 11 times, respectively. By this stretching treatment, a surface roughened film having superior mechanical strength and rigidity and a large number of surface irregularities can be produced.

The sheet obtained from the polypropylene of the present invention is superior in electric insulation characteristics and therefore has superior characteristics as an original rolled sheet for a capacitor film. When this sheet is stretched and preferably biaxially stretched to form a film, the obtained film is increased in the number of surface irregularities and surface-roughened, and therefore, it is superior in anti-blocking effect. Such a film which is excellent in electric insulation properties, is increased in surface irregularities and is excellent in anti-blocking effect can be suitably utilized as a capacitor film for a condenser. Although no particular limitation is imposed on the thickness of the capacitor film, the thickness is usually 2 to 100 μm and preferably 4 to 50 μm.

Examples of the applications of the polypropylene of the present invention for electric materials other than the stretched film include insulation films for high-voltage wire cables. The insulation film is generally one prepared by extrusion-laminating the polypropylene on an insulation paper and corresponds to a non-stretched film. The non-stretched film obtained from the polypropylene of the present invention has excellent electric insulation characteristics.

Examples of the applications of the polypropylene of the present invention for electric materials other than the stretched film include electronic material conveying instruments. Specific examples include plate electronic materials used for electric/electronic devices, and particularly, electrostatic adsorption plates in an electrostatic adsorption system which is one of measures of adsorption conveying means that adsorb and convey electronic materials such as printed wiring boards, shadow masks and aperture grills each having a large number of small pores. By using the electrostatic adsorption unit comprising the polypropylene of the present invention, electronic materials and particularly, printed wiring boards and shadow masks each having a large number of small pores can be exactly adsorbed electrostatically, while these materials can be freely or exactly desorbed in good timing when intended. Therefore, if the electrostatic adsorption unit of the present invention is used, it brings about such an excellent effect that these electronic materials can be desorbed without fail irrespective of various factors such as atmospheric temperature and humidity, type and surface condition of materials of the electrostatic adsorption plate and the type of adsorption conveying materials.

Next the present invention will be explained in detail with reference to the following examples, but the present invention should not be restrained by these Examples. The methods used to measure the properties described in these examples are as follows.

[m1] Melt Flow Rate (MFR)

The melt flow rate was measured at 230° C. under a load of 2.16 kg using a method according to ASTM D-1238. Nitrogen was not particularly introduced in a cylinder and pellets were introduced directly into the cylinder to melt the pellets.

[m2] Mw, Mn and Mz

GPC (gel permeation chromatography) was used to measure under the following condition.

Measuring device: 150CV type manufactured by Waters Corporation

Concentration of a sample: 7.5 mg/4 ml

Column: Shodex AD-806 ms manufactured by SHOWA DENKO K.K.

Measuring temperature: 135° C.

Solvent: o-dichlorobenzene

Relative to polystyrene standards

[m3] Intrinsic Viscosity of a Resin Produced in Polymerization Vessels Used after the Second Stage in Multistage Polymerization The intrinsic viscosity was obtained from the following calculation formula (Eq-2).

$$\sum_{i=1}^{n} [\text{Production amount ratio of polymerization vessel } i \times [\eta] \text{ of the polymerization vessel } i] = [\eta] \text{ of a final product} \quad \text{(Eq-2)}$$

[m4] β Crystal Fraction

The β crystal fraction was determined according to the method described in "A. Turner Jones et al, Macromol. Chem., 75, 134 (1964)". Specifically, as the sample sheet, a sheet 0.5 mm in thickness was used. The sheet was obtained by heat-melting the polypropylene at 200° C., extruding the molten polypropylene from a T-die and slowly cooling by passing the polypropylene through one cooling roll kept at 95° C. at a tensile speed of 1.0 m/min. for a cooling time of 0.94 min by the cooling roll. This sheet was subjected to X-ray diffraction carried out in the following conditions, and the β crystal fraction is calculated from the following equation (Eq-3).

(X-Ray Diffraction)

Measuring device: RINT2500, manufactured by Rigaku Corporation

X-ray: Cu, K, 50 kV, 300 mA

Cu target

Point focus

Transmission method

Sample rotation method

Scattering slit: 1 deg

Receiving slit: 0.3 mm

Scanning mode: Continuous

Scanning speed: 2°/min.

Scanning width: 2η

$$\beta \text{ crystal fraction} = H_{\beta 1}/(H_{\beta 1} + H_{\alpha 1} + H_{\alpha 2} + H_{\alpha 3}) \quad \text{(Eq-3)}$$

[In the above equation (Eq-3), $H_{\beta 1}$ is a height (intensity) of a peak corresponding to the scattering of the crystal part of the β crystal (peak at 2θ=16°), $H_{\alpha 1}$ is a height (intensity) of a peak corresponding to the scattering of the crystal part of the α crystal (110), $H_{\alpha 2}$ is a height (intensity) of a peak corresponding to the scattering of the crystal part of the α crystal (040) and $H_{\alpha 3}$ is a height (intensity) of a peak corresponding to the scattering of the crystal part of the α crystal (130). All these values are respectively a peak height after subtracting the scattering of an amorphous part.]

[m5] Fish Eye (FE) Analysis

A 50-μm-thick film was formed by a 25 mmφ T-die molding machine to observe FE visually. The number of FEs having a diameter of 200 μm or more was visually counted to calculate the number of FEs per unit area.

[m6] Intrinsic Viscosity [η]

The intrinsic viscosity was measured in tetralin at 135° C.

[m7] Ash Content

The pellets were placed in a crucible and burned completely. The crucible was then placed in an electric furnace to ash the pellets at 800° C. for 2 hours. The ash remained in the crucible was measured to obtain the ash content (wtppm).

[m8] Chlorine Content 0.8 g of the polypropylene was burned at 400 to 900° C. under an argon/oxygen stream in combustion equipment manufactured by Mitsubishi Kasei Corporation, and then, the combustion gas was trapped by ultra-pure water and concentrated. The concentrated sample solution was subjected to an ion chromatography for determining the chlorine content using DIONEX-DX300 type chromatography measuring device manufactured by Nippon Dionex (k.k.) and an anion column AS4A-SC (Dionex (k.k.)).

[m9] Iron Content 10 g of the polypropylene was exactly weighed and this sample was treated at 300° C. for 4 hours and further at 800° C. for 4 hours to ash the sample. Then an aqueous hydrochloric acid solution of the residue was subjected to ICP-MS analysis (Inductively coupled plasma atomic emission spectrometry).

[m10] Integrated Amount of Eluate

Cross fractional chromatography was used to measure the integrated amount of eluate.

Instrument: CFC T150A type, manufactured by Mitsubishi Petrochemical Co., Ltd.

Condition: GPC column, Shodex AT-806MS

GPC column temperature: 135° C.

Eluent: o-dichlorobenzene

Flow rate: 1 ml/min.

Eluted fractions: 0 to 135° C., in 5° C. steps

The total amount eluted until the temperature became 100° C. and the total amount eluted until the temperature became 110° C. were shown as each integrated amount.

[m11] Haze (HAZE)

With respect to the stretched films, each haze was determined according to JIS K7105

[m12] Break Down Voltage (BDV)

The break down voltage was measured at 80° C. according to JIS-2330. Also, from the same film, 20 measurement test pieces existing at each optional position were sampled and were subjected to BDV measurement to calculate the deviation (σ) of the BDV values according to the following equation (Eq-4) The deviation of BDV was expressed by a percentage obtained by multiplying σ by 100.

$$\sigma = (\text{Maximum } BDV - \text{Minimum } BDV)/\text{Maximum } BDV \quad \text{(Eq-4)}$$

[m13] Mesopentad Fraction ([$M_5$])

The Mesopentad fraction was measured using $^{13}$C-NMR.

Instrument: JNM-LA400 type, manufactured by JEOL Ltd.

Solvent: Mixture of benzene deuteride/1,2,4-trichlorobenzene

Measuring conditions: Pulse repeat time is 5 seconds, integrated number is 20000 and measuring temperature is 125° C.

The Mesopentad fraction was determined by calculating the area ratio of the peak area of $P_{mmmm}$ to the total peak area of a methyl carbon region (see the above Eq-1).

Example 1

(1) Production of a Polypropylene

[Preparation of a Solid Titanium Catalyst Component (a)]

A glass container having an internal volume of 10 L was charged with 952 g of magnesium chloride anhydride (obtained by further milling a flake product), 4420 ml of decane and 3906 g of 2-ethylhexylalcohol and the mixture was heated at 130° C. for 2 hours to obtain a homogeneous solution. 213 g of phthalic acid anhydride was added to this solution, which was then further mixed with stirring at 130° C. for one hour to dissolve the phthalic acid anhydride.

The thus obtained homogeneous solution was cooled to 23° C. and allowed to stand for 10 hours. Then, the supernatant was withdrawn from the position at a height of 10 cm down from the level in this homogeneous solution at a rate of 50 ml/min. in a total amount of 750 ml. The above magnesium chloride solution was added dropwise to 2000 ml of titanium tetrachloride kept at −20° C. in a separate 10 L container over one hour. After the addition was finished, the temperature of the resulting mixture solution was raised to 110° C. over 4 hours and when the temperature reached 110° C., 52.2 g of diisobutyl phthalate (DIBP) was added. The resulting mixture was kept at the same temperature with stirring the mixture for 2 hours. Then, the solid part was collected by filtration under heating, and the solid part was resuspended in 2750 ml of titanium tetrachloride and heated again at 110° C. for 2 hours.

After the heating was finished, the solid part was again collected by filtration under heating and then washed with 110° C. decane and hexane until no titanium compound was detected in the washing solution. The thus prepared solid titanium catalyst component (a) was stored in the form of a hexane slurry, and a part of which was dried to investigate the catalyst composition. The solid titanium catalyst component (a) contained 3% by weight of titanium, 58% by weight of chlorine, 18% by weight of magnesium and 21% by weight of DIBP.

[Preparation of a Prepolymerization Catalyst]

A 10 L of autoclave equipped with a stirrer was, in a nitrogen atmosphere, charged with 7 L of refined heptane, 0.16 mol of triethylaluminum and the solid titanium catalyst component (a) obtained above in an amount of 0.053 mol relative to a titanium atom, and then 900 g of propylene was introduced to the autoclave and the reaction was carried out for one hour while keeping the temperature of 5° C. or lower.

After the polymerization was finished, the atmosphere in the reactor was replaced with nitrogen, and the removal of the supernatant and washing with refined heptane were carried out three times. The resulting prepolymerization catalyst was resuspended in purified heptane, which was then transferred to a catalyst supplying vessel to adjust the concentration of the solid titanium catalyst component (a) to 1 g/L by using refined heptane. This prepolymerization catalyst contained polypropylene in an amount of 10 g per 1 g of the solid titanium catalyst component (a).

[Polymerization]

A polymerization vessel 1 having an internal volume of 140 L and equipped with a stirrer was charged with 20 L of liquefied propylene. 80 kg/hr of liquefied propylene, 18 g/hr of the prepolymerization catalyst, 47 mmol/hr of triethylaluminum and 9 mmol/hr of cyclohexylmethyldimethoxysilane were continuously supplied to the polymerization vessel 1 while keeping the liquid level in the vessel 1 to polymerize at 73° C. In this case, hydrogen was not supplied to the polymerization vessel 1. The proportion of the produced polymer in this polymerization vessel 1 (the ratio of the amount of the produced polymer in the polymerization vessel 1 to the total amount of the produced polymer) is shown in Table 1. The obtained polymer in a slurry state was fed to a 500 L polymerization vessel 2 equipped with a stirrer.

A part of the polymer obtained above was sampled to measure its intrinsic viscosity, and as a result, the intrinsic viscosity was found to be 6.0 dl/g.

In the polymerization vessel 2, 70 kg/hr of liquefied propylene was newly supplied continuously while keeping a liquid level of 300 L to polymerize at 71° C. Also, hydrogen was continuously supplied in such a manner that the hydrogen concentration in the vapor phase in the polymerization vessel 2 was kept at 0.4 mol %. The proportion of the produced polymer in this polymerization vessel 2 (the ratio of the amount of the produced polymer in the polymerization vessel 2 to the total amount of the produced polymer-) is shown in Table 1. The obtained polymer in a slurry state was fed to a 500 L polymerization vessel 3 equipped with a stirrer. A part of the polymer obtained above was sampled to measure its intrinsic viscosity, and as a result, the intrinsic viscosity was found to be 1.9 dl/g. It was judged from this result that the intrinsic viscosity of the produced polymer in the polymerization vessel 2 was calculated to be 1.8 dl/g.

In the polymerization vessel 3, 56 kg/hr of liquefied propylene was newly supplied continuously while keeping a liquid level of 300 L to polymerize at 70° C. Also, as in the polymerization vessel 2, hydrogen was continuously supplied in such a manner that the hydrogen concentration in the vapor phase was kept at 0.4 mol %. The resulting slurry was deactivated by adding 10 ml of methanol, then fed to a washing vessel using liquefied propylene. Then, an operation including stirring, stationary process, removal of the supernatant and addition of liquefied propylene (100 L in each time) was repeated seven times to wash the polypropylene powder.

The proportion of the produced polymer in this polymerization vessel 3 (the ratio of the amount of the produced polymer in the polymerization vessel 3 to the total amount of the produced polymer) is shown in Table 1. Thereafter, propylene was vaporized to obtain a polypropylene powder. The intrinsic viscosity of this sample was measured, and as a result, it was found to be 1.8 dl/g. It was judged from this result that the intrinsic viscosity of the polypropylene produced in the polymerization vessel 3 was calculated to be 1.8 dl/g.

[Pelletization]

To 100 parts by weight of the obtained polypropylene, 0.1 parts by weight of 3,5-di-tert-butyl-4-hydroxytoluene as an antioxidant, 0.2 parts by weight of tetrakis [methylene-3(3, 5-di-tert-butyl-4-hydroxyphenyl)propionate]methane as an antioxidant and 0.01 parts by weight of calcium stearate as a neutralizer were blended. The mixture was pelletized by melt-kneading at a resin temperature of 230° C. by using a single-screw extruder. As a granulator, GMZ50-32 (L/D=32, single screw) manufactured by GM Engineering Ltd. was used. The integrated amount of the obtained pellets measured in a cross fraction chromatography was analyzed to find that the total amount of eluate, namely the integrated amount up to 110° C. was 21.3%, and the total amount of eluate, namely the integrated amount up to 100° C. was 3.5%.

As to the obtained pellets, the titanium content in the firing residue was measured to find that the titanium content was 0.5 ppm by weight based on the polypropylene. Other measured properties are summarized in Tables 1 and 2.

(2) Molding of a Sheet

The polypropylene pellets obtained above were melted to 200° C. in a 50 mmφ extruder, and the molten polypropylene was extruded from a T-die and slowly cooled through one cooling roll kept at 95° C. at a tensile speed of 1.0 m/min. for a cooling time of 0.94 min. by a chill roll to obtain a sheet having a thickness of 0.5 mm. The details of the sheet molding conditions are as follows. The sheet obtained through this chill roll was cut, and β crystal fraction was obtained using X-ray diffraction apparatus by the aforementioned method. The results are shown in Table 2.

Molding apparatus: VSK model 50 manufactured by Nakatani Kikai (k.k.)
Molding temperature: Cylinder, dice temperature=200° C.
Die slip width: 600 mm
Chill roll temperature: 95° C.
Air gap: 60 mm
Drawing speed: 1.0 m/min.
Chill roll diameter: 450 mm (3) Molding of a Film The sheet obtained in the above (2) was cut into a size of 85 mm×85 mm and biaxially stretched in the following conditions to obtain a biaxially stretched film having a thickness of 14 μm. The properties of the film are shown in Table 3.

Stretching machine: KAROIV, manufactured by Bruckner Company
Preheating temperature: 152° C.
Preheating time: 60 seconds
Stretch ratio: 5×7
  (5 times in the direction of MD and 7 times in the direction of TD), sequential biaxial stretching
Stretching speed: 10 m/min.

Example 2

The same procedures as in Example 1 were conducted except that the polymerization was changed as follows.

[Polymerization]

A polymerization vessel 1 having an internal volume of 140 L and equipped with a stirrer was charged with 100 L of liquefied propylene. 105 kg/hr of liquefied propylene, 18 g/hr of the prepolymerization catalyst obtained in Example 1, 47 mmol/hr of triethylaluminum and 9 mmol/hr of cyclohexylmethyldimethoxysilane were continuously supplied to the polymerization vessel 1 while keeping the liquid level in the vessel 1 to polymerize at 73° C. In this case, hydrogen was supplied continuously to the polymerization vessel 1 in such a manner that the hydrogen concentration in the vapor phase of the polymerization vessel 1 was kept at 0.01 mol %. The proportion of the produced polymer in this polymerization vessel 1 is shown in Table 1. The obtained polymer in a slurry state was fed to a 500 L polymerization vessel 2 equipped with a stirrer. A part of the polymer obtained above was sampled to measure its intrinsic viscosity, and as a result, the intrinsic viscosity was found to be 3.9 dl/g.

In the polymerization vessel 2, 140 kg/hr of liquefied propylene was newly supplied continuously, while keeping a liquid level of 300 L to polymerize at 71° C. Also, hydrogen was continuously supplied in such a manner that the hydrogen concentration in the vapor phase of the polymerization vessel 2 was kept at 0.57 mol %. The proportion of the produced polymer in this polymerization vessel 2 is shown in Table 1. The obtained polymer in a slurry state was fed to a 500 L polymerization vessel 3 equipped with a stirrer. A part of the polymer obtained above was sampled to measure its intrinsic viscosity, and as a result, the intrinsic viscosity was found to be 2.0 dl/g. It was judged from this result that the intrinsic viscosity of the produced polymer in the polymerization vessel 2 was calculated to be 1.5 dl/g.

In the polymerization vessel 3, 55 kg/hr of liquefied propylene was newly supplied continuously while keeping a liquid level of 300 L in the polymerization vessel 3 to polymerize at 70° C. Also, in the same manner as in the case of the polymerization vessel 2, hydrogen was continuously supplied in such a manner that the hydrogen concentration in the vapor phase was kept at 0.57 mol %. The resulting slurry was deactivated, then fed to a washing vessel using liquefied propylene and thereafter the polypropylene powder was washed. The proportion of the produced polymer in this polymerization vessel 3 is shown in Table 1. Thereafter, propylene was vaporized to obtain a polypropylene powder. The intrinsic viscosity of this sample was measured to find that it was 1.8 dl/g. It was judged from this result that the intrinsic viscosity of the polypropylene produced in the polymerization vessel 3 was calculated to be 1.5 dl/g.

[Pelletization]

Using the obtained polypropylene, polypropylene pellets were obtained in the same manner as in Example 1. The measured properties of the obtained pellets are summarized in Tables 1 and 2. The integrated amount in a cross fraction chromatography of the obtained pellets was analyzed to find that the total amount of eluate, namely the integrated amount up to 110° C. was 20.7% and the total amount of eluate, namely the integrated amount up to 100° C. was 3.4%.

Also, the β crystal fraction of a sheet obtained from the polypropylene obtained above in the same method as in Example 1 and the properties of the film after it was biaxially stretched are shown in Table 3.

Example 3

The same procedures as in Example 1 were conducted except that the polymerization was changed as follows.

[Polymerization]

A polymerization vessel 1 having an internal volume of 140 L and equipped with a stirrer was charged with 100 L of liquefied propylene. 83 kg/hr of liquefied propylene, 18 g/hr of the prepolymerization catalyst obtained in Example 1, 47 mmol/hr of triethylaluminum and 9 mmol/hr of cyclohexylmethyldimethoxysilane were continuously supplied to the polymerization vessel 1 while keeping the liquid level in the vessel 1 to polymerize at 73° C. In this case, hydrogen was supplied continuously to the polymerization vessel 1 in such a manner that the hydrogen concentration in the vapor phase of the polymerization vessel 1 was kept at 0.30 mol %. The proportion of the produced polymer in this polymerization vessel 1 is shown in Table 1. The obtained polymer in a slurry state was fed to a 500 L polymerization vessel 2 equipped with a stirrer. A part of the polymer obtained above was sampled to measure its intrinsic viscosity, and as a result, the intrinsic viscosity was found to be 2.1 dl/g.

In the polymerization vessel 2, 217 kg/hr of liquefied propylene was newly supplied continuously while keeping a liquid level of 300 L to polymerize at 71° C. Also, hydrogen was continuously supplied in such a manner that the hydrogen concentration in the vapor phase of the polymerization vessel 2 was kept at 0.30 mol %. The proportion of the obtained polymer in this polymerization vessel 2 is shown in Table 1. The obtained polymer in a slurry state was fed to a 500 L polymerization vessel 3 equipped with a stirrer. A part of the polymer obtained above was sampled to measure its intrinsic viscosity, and as a result, the intrinsic viscosity was found to be 2.1 dl/g. It was judged from this result that the intrinsic viscosity of polymers produced in the polymerization vessel 2 was calculated to be 2.1 dl/g.

In the polymerization vessel 3, 75 kg/hr of liquefied propylene was newly supplied continuously while keeping a liquid level of 300 L to polymerize at 70° C. Also, in the same manner as in the case of the vessel 2, hydrogen was continuously supplied in such a manner that the hydrogen concentration in the vapor phase was kept at 0.30 mol %. The resulting slurry was deactivated, then fed to a washing vessel using liquefied propylene and thereafter the polypropylene powder was washed. The proportion of the produced polymer in this polymerization vessel 3 is shown in Table 1. Thereafter, propylene was vaporized to obtain a polypropylene powder. The intrinsic viscosity of this sample was measured to find that it was 2.1 dl/g. It was judged from this result that the intrinsic viscosity of the polypropylene produced in the polymerization vessel 3 was calculated to be 2.1 dl/g.

[Pelletization]

Polypropylene pellets were obtained using the polypropylene obtained in the same manner as in Example 1. The measured properties of the obtained pellets are summarized in Tables 1 and 2. The integrated amount in a cross fraction chromatography of the pellets was analyzed to find that the total amount of eluate, namely the integrated amount up to 110° C. was 22.5%, and the total amount of eluate, namely the integrated amount up to 100° C. was 3.6%.

Also, the β crystal fraction of a sheet obtained from the polypropylene obtained above in the same method as in Example 1 and the properties of the film after it was biaxially stretched are shown in Table 3.

Example 4

The same procedures as in Example 1 were conducted except that the polymerization was changed as follows. The results are shown in Tables 1 to 3.

[Polymerization]

A polymerization vessel 1 having an internal volume of 140 L and equipped with a stirrer was charged with 100 L of liquefied propylene. 64 kg/hr of liquefied propylene, 18 g/hr of the prepolymerization catalyst obtained in Example 1, 47 mmol/hr of triethylaluminum and 9 mmol/hr of cyclohexylmethyldimethoxysilane were continuously supplied to the polymerization vessel 1 while keeping the liquid level in the vessel 1 to polymerize at 73° C. In this case, hydrogen was not supplied to the polymerization vessel 1. The proportion of polymers produced in this polymerization vessel 1 is shown in Table 1. The obtained polymer in a slurry state was fed to a 500 L polymerization vessel 2 equipped with a stirrer. A part of the polymer obtained above was sampled to measure its intrinsic viscosity, and as a result, the intrinsic viscosity was found to be 6.0 dl/g.

In the polymerization vessel 2, 86 kg/hr of liquefied propylene was newly supplied continuously while keeping a liquid level of 300 L to polymerize at 71° C. Also, hydrogen was continuously supplied in such a manner that the hydrogen concentration in the vapor phase of the polymerization vessel 2 was kept at 0.55 mol %. The proportion of polymers produced in this polymerization vessel 2 is shown in Table 1. The obtained polymer in a slurry state was fed to a 500 L polymerization vessel 3 equipped with a stirrer. A part of the polymer obtained above was sampled to measure its intrinsic viscosity, and as a result, the intrinsic viscosity was found to be 2.0 dl/g. It was judged from this result that the intrinsic viscosity of polymers generated in the polymerization vessel 2 was calculated to be 1.6 dl/g.

In the polymerization vessel 3, 56 kg/hr of liquefied propylene was newly supplied continuously while keeping a liquid level of 300 L to polymerize at 70° C. Also, in the same manner as in the case of the polymerization vessel 2, hydrogen was continuously supplied in such a manner that the hydrogen concentration in the vapor phase was kept at 0.55 mol %. The resulting slurry was deactivated, then fed to a washing vessel using liquefied propylene and thereafter the polypropylene powder was washed. The proportion of the produced polymer in this polymerization vessel 3 is shown in Table 1. Thereafter, propylene was vaporized to obtain a polypropylene powder. The intrinsic viscosity of this sample was measured to find that it was 1.9 dl/g. It was judged from this result that the intrinsic viscosity of the polypropylene produced in the polymerization vessel 3 was calculated to be 1.6 dl/g. The integrated amount in a cross fraction chromatography of the pellets was analyzed to find that the total amount of eluate, namely the integrated amount up to 110° C. was 21.0%, and the total amount of eluate, namely the integrated amount up to 100° C. was 3.5%.

Example 5

The same procedures as in Example 1 were conducted except that the polymerization was changed as follows.

[Polymerization]

A polymerization vessel 1 having an internal volume of 140 L and equipped with a stirrer was charged with 100 L of liquefied propylene. 105 kg/hr of liquefied propylene, 18 g/hr of the prepolymerization catalyst obtained in Example 1, 47 mmol/hr of triethylaluminum and 55 mmol/hr of dicyclopentyldimethoxysilane were continuously supplied to the polymerization vessel 1 while keeping the liquid level in the vessel 1 to polymerize at 73° C. In this case, hydrogen was supplied continuously to the polymerization vessel 1 in such a manner that the hydrogen concentration in the vapor phase of the polymerization vessel 1 was kept at 0.01 mol %. The proportion of the produced polymer in this polymerization vessel 1 is shown in Table 1. The obtained polymer as in a slurry state was fed to a 500-L polymerization vessel 2 equipped with a stirrer. A part of the polymer obtained above was sampled to measure its intrinsic viscosity, and as a result, the intrinsic viscosity was found to be 3.9 dl/g.

In the polymerization vessel 2, 140 kg/hr of liquefied propylene was newly supplied continuously while keeping a liquid level of 300 L to polymerize at 71° C. Also, hydrogen was continuously supplied in such a manner that the hydrogen concentration in the vapor phase of the polymerization vessel 2 was kept at 0.57 mol %. The proportion of the produced polymer in this polymerization vessel 2 is shown in Table 1. The obtained polymer in a slurry state was fed to a 500 L polymerization vessel 3 equipped with a stirrer. A part of the polymer obtained above was sampled to measure its intrinsic viscosity, and as a result, the intrinsic viscosity was found to be 2.0 dl/g. It was judged from this result that the intrinsic viscosity of polymers generated in the polymerization vessel 2 was calculated to be 1.5 dl/g.

In the polymerization vessel 3, 55 kg/hr of liquefied propylene was newly supplied continuously while keeping a liquid level of 300 L in the polymerization vessel 3 to polymerize at 70° C. Also, in the same manner as in the case of the vessel 2, hydrogen was continuously supplied in such a manner that the hydrogen concentration in the vapor phase was kept at 0.35 mol %. The resulting slurry was deactivated, then fed to a washing vessel using liquefied propylene and thereafter the polypropylene powder was washed. The proportion of polymers produced in this polymerization vessel 3 is shown in Table 1. Thereafter, propylene was vaporized to obtain a polypropylene powder. The intrinsic viscosity of this sample was measured to find that it was 1.8 dl/g. It was judged from this result that the intrinsic viscosity of the polypropylene produced in the polymerization vessel 3 was calculated to be 1.5 dl/g.

[Pelletization]

Using the obtained polypropylene, polypropylene pellets were obtained in the same manner as in Example 1. The measured properties of the obtained pellets are summarized in Tables 1 and 2. The integrated amount in a cross fraction chromatography of the pellets was analyzed to find that the total amount of eluate, namely the integrated amount up to 110° C. was 17.1%, and the total amount of eluate, namely the integrated amount up to 100° C. was 2.3%. The mesopentad fraction measured by NMR was 0.981.

Also, the β crystal fraction of a sheet obtained from the polypropylene obtained above in the same method as in Example 1 and the properties of the film after it was biaxially stretched are shown in Table 3.

Comparative Example 1

The same procedures as in Example 1 were conducted except that the solid titanium catalyst component was produced by polymerizing in the following condition. The results are shown in Tables 1 to 3.

[Preparation of a Solid Titanium Catalyst Component (a')]

A glass container having an internal volume of 10 L was charged with 952 g of magnesium chloride anhydride (obtained by further milling a flake product), 4420 ml of decane and 3906 g of 2-ethylhexylalcohol, and the mixture was heated at 130° C. for 2 hours to obtain a homogeneous solution. 213 g of phthalic acid anhydride was added to this solution, which was then mixed with stirring at 130° C. for further one hour to dissolve the phthalic acid anhydride.

The thus obtained homogeneous solution obtained was cooled to 23° C. and allowed to stand for 10 hours. Then, 750 ml of the homogeneous solution was withdrawn through a nozzle disposed at the bottom of the glass container. The above magnesium chloride solution was added dropwise to 2000 ml of titanium tetrachloride kept at −20° C. in a separate 10 L container over one hour. After the addition was finished, the temperature of the resulting mixture solution was raised to 110° C. over 4 hours and when the temperature reached 110° C., 52.2 g of diisobutyl phthalate (DIBP) was added. The resulting mixture was kept at the same temperature with stirring for 2 hours, and then, the solid part was collected by filtration under heating. The solid part was resuspended in 2750 ml of titanium tetrachloride and heated again at 110° C. for 2 hours.

After the heating was finished, the solid part was again collected by filtration under heating and then washed with 110° C. n-decane and n-hexane until no titanium compound was detected in the washing solution. A solid titanium catalyst component (a') prepared in the above manner was stored in the form of a hexane slurry, a part of which was dried, and catalyst composition was investigated. The solid titanium catalyst component (a) contained 3% by weight of titanium, 58% by weight of chlorine, 18% by weight of magnesium and 21% by weight of DIBP.

The titanium content in the firing residue of the obtained pellets was measured to find that it was 0.7 ppm by weight based the polypropylene. Other measured properties are summarized in Tables 1 and 2.

Comparative Example 2

The same method as in Comparative Example 1 was used to carry out the production of polypropylene, formation of a sheet and formation of a film. The properties of the obtained polypropylene are shown in Tables 1 and 2 and the properties of the film are shown in Table 3.

TABLE 1

|  | Intrinsic viscosity [η] (dl/g) | | | Production amount (wt %) | | |
| --- | --- | --- | --- | --- | --- | --- |
|  | First stage | Second stage | Third stage | First stage | Second stage | Third stage |
| Example 1 | 6.0 | 1.8 | 1.8 | 1 | 59 | 40 |
| Example 2 | 3.9 | 1.5 | 1.5 | 10 | 50 | 40 |
| Example 3 | 2.1 | 2.1 | 2.1 | 30 | 44 | 26 |
| Example 4 | 6.0 | 1.6 | 1.6 | 6 | 44 | 50 |
| Example 5 | 3.9 | 1.5 | 1.5 | 10 | 50 | 40 |
| Comparative Example 1 | 5.8 | 1.8 | 1.8 | 1 | 59 | 40 |
| Comparative Example 2 | 5.8 | 1.8 | 1.7 | 1 | 59 | 40 |

TABLE 2

|  | MFR (g/10 min.) | Mz (−) | Mw (−) | Mn (−) | Mz/Mn (−) | Mw/Mn (−) | β crystal fraction (−) | Ash content (wt ppm) | Chlorine content (wt ppm) | Iron content (wt ppm) |
| --- | --- | --- | --- | --- | --- | --- | --- | --- | --- | --- |
| Example 1 | 2.8 | 1,208,000 | 332,000 | 54,000 | 22.4 | 6.1 | 0.25 | 18 | 1 | 0.05 or less |
| Example 2 | 2.8 | 1,359,000 | 353,000 | 54,000 | 25.2 | 6.5 | 0.26 | 21 | 1 | 0.05 or less |
| Example 3 | 2.3 | 1,150,000 | 348,000 | 65,000 | 17.7 | 5.4 | 0.18 | 22 | 1 | 0.05 or less |
| Example 4 | 2.6 | 1,381,000 | 349,000 | 51,000 | 27.1 | 6.8 | 0.39 | 19 | 1 | 0.05 or less |
| Example 5 | 2.7 | 1,346,000 | 358,000 | 56,000 | 24.0 | 6.4 | 0.23 | 25 | 1 | 0.05 or less |
| Comparative Example 1 | 2.9 | 1,221,000 | 330,000 | 55,000 | 22.2 | 6.0 | 0.24 | 25 | 2 | 0.4 |
| Comparative Example 2 | 3.0 | 1,218,000 | 331,000 | 55,000 | 22.1 | 6.0 | 0.24 | 26 | 2 | 0.5 |

TABLE 3

|  | Integrated amount of eluate | | [$M_5$] [Note 1] | FE [Note 2] (FEs/600 cm$^2$) | HAZE [Note 3] (%) | Deviation of BDV [Note 4] (%) |
| --- | --- | --- | --- | --- | --- | --- |
|  | 110° C. or less (%) | 100° C. or less (%) |  |  |  |  |
| Example 1 | 21.3 | 3.5 | 0.943 | 3 | 56 | 12 |
| Example 2 | 20.7 | 3.4 | 0.945 | 3 | 57 | 13 |
| Example 3 | 22.5 | 3.6 | 0.939 | 2 | 31 | 15 |
| Example 4 | 21.0 | 3.5 | 0.942 | 7 | 68 | 11 |
| Example 5 | 17.1 | 2.3 | 0.981 | 4 | 54 | 17 |
| Comparative Example 1 | 22.1 | 3.6 | 0.941 | 5 | 54 | 34 |
| Comparative Example 2 | 21.9 | 3.6 | 0.941 | 5 | 53 | 32 |

[Note 1] Mesopentad fraction defined by the equation (Eq-1)
[Note 2] The number of FEs on a CPP film having a thickness of 50 μm
[Note 3] Haze of the stretched film
[Note 4] (Maximum BDV − Minimum BDV)/Maximum BDV for 20 CPP films each having a thickness of 14 μm

INDUSTRIAL APPLICABILITY

The polypropylene of the present invention can be very reduced in the amount of impurities, and also increased in β crystal fraction by slowly cooling it in specified conditions. Therefore, when a sheet is formed from the polypropylene, a high-quality sheet having a high content of β crystal can be obtained. Such a polypropylene of the present invention is suitably used for capacitor films, non-stretched films or materials for an instrument for conveying an electronic material, which are excellent electric insulation and anti-blocking characteristics.

The invention claimed is:

1. A polypropylene for an electric material satisfying the following requirements (1) to (5) at the same time:
   (1) the melt flow rate is 0.1 to 30 g/10 mm;
   (2) the mesopentad fraction calculated from a $^{13}$C-NMR spectrum is 0.90 to 0.99;
   (3) the firing residue is 50 ppm by weight or less based on the polypropylene, the titanium content and the iron content which are detected from the firing residue are 1 ppm by weight or less and 0.05 ppm by weight or less, respectively, based on the polypropylene, and the chlorine content is 5 ppm by weight or less based on the polypropylene;
   (4) the integrated amount of eluate measured up to 110° C. is 30% by weight or less, and an integrated amount of eluate measured up to 100° C. is 7.0% by weight or less, in a cross fraction chromatography (CFC method); and
   (5) the Mz/Mn and an Mw/Mn determined by GPC of 15 or more and 5 or more, respectively.

2. A polypropylene sheet having a β crystal fraction of 0.15 or more, which is obtained by heat-melting, extruding and slowly cooling the polypropylene as claimed in claim 1.

3. A stretched film, which is obtained by stretching the polypropylene sheet as claimed in claim 2.

4. A condenser comprising a capacitor film formed of the stretched film according to claim 3.

5. A non-stretched film, which is obtained by extruding the polypropylene as claimed in claim 1.

6. An electronic material conveying instrument, which is obtained by injection-molding the polypropylene as claimed in claim 1.

* * * * *